United States Patent
Burda et al.

(10) Patent No.: US 12,271,430 B2
(45) Date of Patent: Apr. 8, 2025

(54) DATA CATALOGING BASED ON CLASSIFICATION MODELS

(71) Applicant: HITACHI VANTARA LLC, Santa Clara, CA (US)

(72) Inventors: Leon Burda, Cupertino, CA (US); Lingling Yan, Morgan Hill, CA (US); Shayak Sadhu, Hooghly (IN)

(73) Assignee: HITACHI VANTARA LLC, Santa Clara, CA (US)

( * ) Notice: Subject to any disclaimer, the term of this patent is extended or adjusted under 35 U.S.C. 154(b) by 3 days.

(21) Appl. No.: 18/036,468

(22) PCT Filed: Nov. 17, 2020

(86) PCT No.: PCT/US2020/060834
§ 371 (c)(1),
(2) Date: May 11, 2023

(87) PCT Pub. No.: WO2022/108576
PCT Pub. Date: May 27, 2022

(65) Prior Publication Data
US 2024/0012859 A1    Jan. 11, 2024

(51) Int. Cl.
*G06F 16/906*    (2019.01)
*G06F 16/907*    (2019.01)

(52) U.S. Cl.
CPC .......... *G06F 16/906* (2019.01); *G06F 16/907* (2019.01)

(58) Field of Classification Search
CPC .............................. G06F 16/906; G06F 16/907
USPC ....................................................... 707/737
See application file for complete search history.

(56) References Cited

U.S. PATENT DOCUMENTS

| 9,110,964 | B1 * | 8/2015 | Shilane | G06F 16/178 |
| 10,242,016 | B2 | 3/2019 | Gorelik | |
| 2013/0067319 | A1 * | 3/2013 | Olszewski | G06F 40/117 |
| | | | | 715/234 |
| 2014/0365450 | A1 * | 12/2014 | Trimble | G06F 16/1748 |
| | | | | 707/692 |
| 2015/0278241 | A1 * | 10/2015 | Bates-Haus | G06F 16/1748 |
| | | | | 707/692 |

(Continued)

OTHER PUBLICATIONS

Sheenam Jain et al., "Garment Categorization Using Data Mining Techniques", Symmetry, Jun. 9, 2020.

(Continued)

*Primary Examiner* — Muluemebet Gurmu
(74) *Attorney, Agent, or Firm* — MATTINGLY & MALUR, PC

(57) ABSTRACT

In some examples, a system receives a user input to create a classification to use for a first data set. In addition, the system may receive a user input to associate the classification with the first data set as reference data. The system may determine a classification association with the first data set based in part on comparing a first classification model corresponding to the reference data with a second classification model of a second data set, the second classification model being determined based at least in part on a plurality of data properties of the second data set. Further, the system may determine a user curation result with respect to the classification association with the first data set, and may update the classification model for the first data set based at least in part on the user curation result.

20 Claims, 4 Drawing Sheets

(56) References Cited

U.S. PATENT DOCUMENTS

2015/0356094 A1 12/2015 Gorelik et al.
2017/0286869 A1* 10/2017 Zarosim ................. G06N 5/025

OTHER PUBLICATIONS

International Search Report of PCT/US2020/060834 dated Feb. 12, 2021.

* cited by examiner

DATA CATALOGING BASED ON CLASSIFICATION MODELS

TECHNICAL FIELD

This disclosure relates to the technical field of storing, classifying, and accessing data, such as in systems that store large amounts of data.

BACKGROUND

Automatically classifying large amounts of data requires that the classification be accurate for the data to be useful. However, data classification methods that are based on a static model and/or algorithm can tend to produce too many false positives and false negatives. Various reasons for this may be due to unpredictable, dirty, misleading, and/or ambiguous data samples. Some conventional techniques for improving data classification accuracy may include use of machine learning models. However, these machine learning models typically require extensive user training of the machine learning model by using large amounts of training data. Realistically, such extensive training with sufficiently large amounts of training data is not usually possible. Accordingly, automatically classifying large collections of data can be challenging.

SUMMARY

Some examples herein include a system that receives a user input to create a classification to use for a first data set. In addition, the system may receive a user input to associate the classification with the first data set as reference data. The system may determine a classification association with the first data set based in part on comparing a first classification model corresponding to the reference data with a second classification model of a second data set, the second classification model being determined based at least in part on a plurality of data properties of the second data set. Further, the system may determine a user curation result with respect to the classification association with the first data set, and may update the classification model for the first data set based at least in part on the user curation result.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DESCRIPTION OF THE EMBODIMENTS

Figure 1:
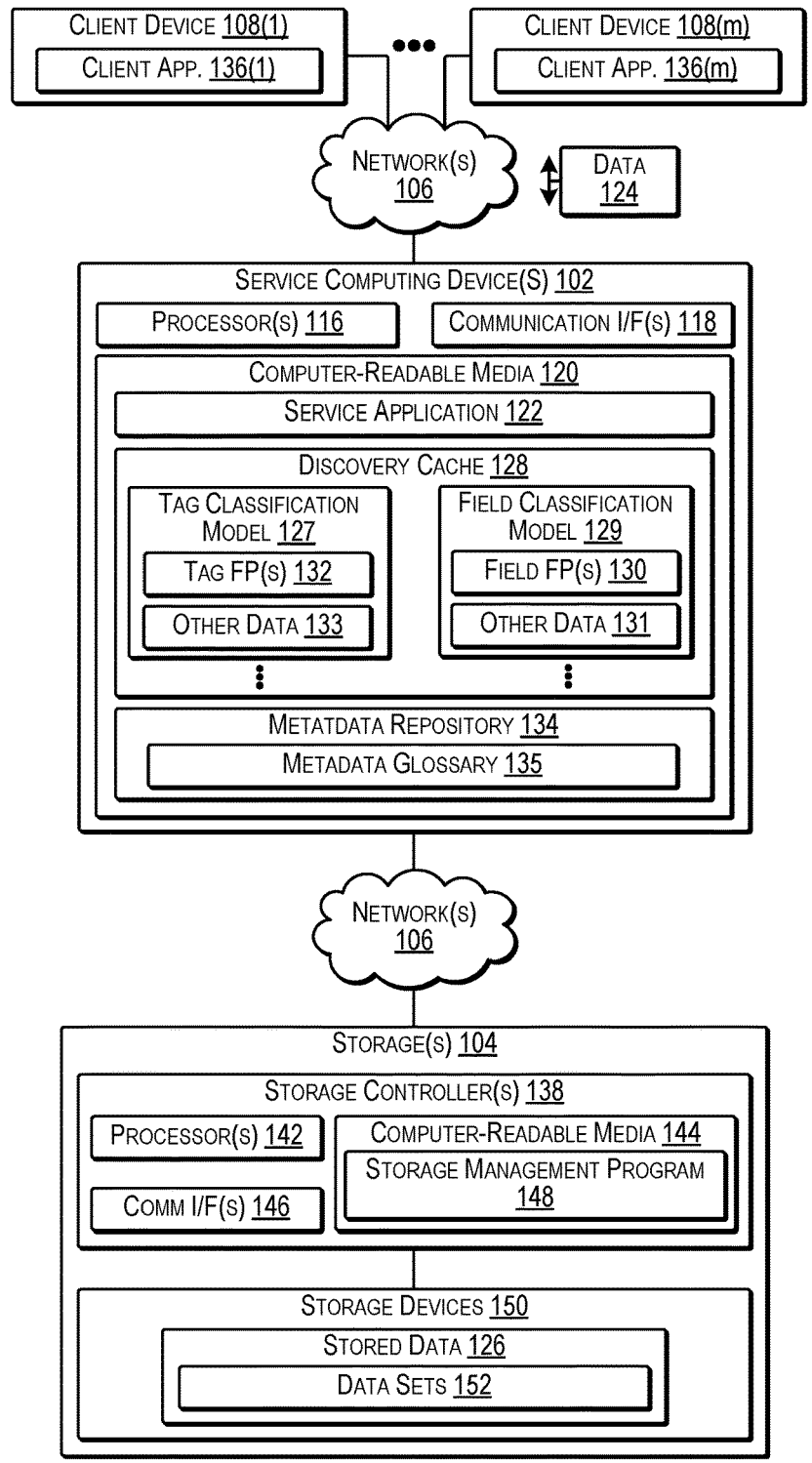
FIG. 1 illustrates an example architecture of a system able to classify data according to some implementations.

Some implementations herein are directed to techniques and arrangements for cataloging data based in part on generating, maintaining, and updating a metadata repository for the data. For instance, some examples employ a feature set that is extensive and meaningful for a given data classification by taking into account both supportive features and contradictory features. Further, some implementations include a classification model update technique to enable more accurate data classification based on a receipt of positive and/or negative user curation actions.

In addition, some examples herein may maintain a respective classification model for each classified data set. The classification model is able to adapt to enterprise data culture and conventions. For instance, the classification model may be iteratively generated and iteratively updated by continually learn based on the user curation actions. Further, some examples may employ a significance vector that can lead to more accurate data classification by iteratively adjusting or otherwise updating the significance vector based on learning from both positive and negative user curation actions. The updating of the classification model and the updating of the associated significance vector may be performed differently between supportive feedback and negative feedback.

Some implementations herein enable systematic organization of data on a data platform so that the platform users can reliably and efficiently access desired data without requiring the users to have knowledge of the underlying data organization configuration. This may be achieved, at least in part, by performing an automatic inventory of all files, which may include capturing the lineage, format, and profile of each file in a metadata repository. In some cases, the system may deduce the meaning of values in the fields of a file by analyzing other files that have field names with meaningful tags and/or that have been tagged by a user with meaningful tags.

In some implementations, for a given data classification "T", the system may access or may generate a feature set "$\Omega_T$" for a tag classification model "$D_T$" of the classification T, and may generate a significance vector "$A_T$" for the features of the tag classification model $D_T$. For example, the tag classification model $D_T$ may enable classification and discovery of the data within a large volume of data classified in the metadata repository herein. In some examples, the tag classification model $D_T$ may include aggregated fingerprints from the data sets (fields) selected as reference data (seeds) and a feature set based on data from this aggregated fingerprint. Additionally, the tag classification model may enable significance adjustments for the features in the feature set. In addition, the tag classification model may include other metadata that may be useful for classification model matching with other classification models of other data, such as statistics accumulated from user curation activity. Further, the tag classification model may be updated based on curation inputs received from users. The tag classification models for tags (classifications) and the field classification model for fields (data sets) may be similar (i.e., both include fingerprints of their respective data) which provides the ability to match data sets, as discussed additionally below, and thereby classify and catalog the data.

In addition, the significance vector mentioned above may indicate the significance of similarity between features of classified data and unclassified data. As one example, given a known field "F" classified with a field classification model $D_F$, the system herein may calculate a confidence value as to whether the field F may be classified as the classification T, e.g., whether the data corresponding to the field F should be classified the same as the data corresponding to the classification T. To help make this determination, the system may determine a similarity score between the features of the classified reference data and the unclassified data.

In some implementations, a user may manually determine an initial classification for unclassified data (e.g., a data set or field), and may associate the unclassified data with the classification as reference data to use as a seed for determining other classification associations (also referred to as "tag associations") for the unclassified data. For instance, the reference data may typically include data that is more representative or the most representative of a data classification to which the selected data corresponds. Thus, the data classification may be represented by an example, and the user may select the most representative example available for each data classification that new or otherwise unclassified data has been associated with by the user. In addition, techniques herein may include calculating a confidence level for each classification association that may indicate a degree of confidence that the classification association is correct.

Furthermore a user of the system herein may enable any of a plurality of user actions with respect to the data that is classified in a particular data classification, such as (1) accept the classification; (2) reject the classification; (3) add more reference data (referred to as seed); or (4) change the accuracy of the classification process. Additionally, after classification associations are generated and/or curated, e.g., such as by a user accepting or rejecting a classification association, the classification process may be repeated to (1) obtain adjusted results; or (2) classify new incoming data.

Implementations herein are not dependent on a large number of user curation interactions. For example, the process of manually accessing and correcting results (referred to as "curation") can be time consuming, and, in some cases, data velocity and variety can significantly complicate human visual analysis. Accordingly, the algorithm herein is able to function accurately with limited user curation actions. Further, in some examples herein, the classification may be context free and does not need to take into account the data environment (e.g., surrounding data) or other context in which the classification takes place.

The algorithm executed by the system herein may provide a plurality of results, such as (1) data is classified (e.g., tagged and/or labeled) automatically; (2) data is classified in multiple iterations, and each iteration may take into account any user curation actions that have taken place between that iteration and a prior iteration; (3) after multiple iterations, the confidence level calculations may improve such that there are (a) fewer false positives or incorrectly classified data; and (b) there is an insignificant increase in false negatives or data that cannot be classified. In addition, the results of the classification may be presented in the order of confidence, e.g., with the results that have the highest confidence levels being presented first. Accordingly, implementations herein may provide significant automation of data classification and also may dramatically shorten the time required for performing data cataloging.

For discussion purposes, some example implementations are described in the environment of one or more service computing devices in communication with one or more storages and one or more client devices for receiving and classifying data. However, implementations herein are not limited to the particular examples provided, and may be extended to other types of computing systems, other types of storage environments, other system architectures, and so forth, as will be apparent to those of skill in the art in light of the disclosure herein.

FIG. 1 illustrates an example architecture of a system 100 able to classify data according to some implementations.

The system 100 includes one or more service computing devices 102 that are able to communicate with one or more storages 104 through one or more networks 106. In addition, the service computing device(s) 102 may also be able to communicate over the one or more networks 106 with a plurality of client devices 108(1)-108($m$), such as user devices or other devices that may communicate with the service computing devices 102. For example, the system 100 may store, classify, and manage data for the client devices 108, e.g., as a data storage, data repository, database, data warehouse, or the like.

In some examples, the service computing devices 102 may include a plurality of physical servers or other types of computing devices that may be embodied in any number of ways. For instance, in the case of a server, the modules, programs, other functional components, and a portion of data storage may be implemented on the servers, such as in a cluster of servers, e.g., at a server farm or data center, a cloud-hosted computing service, and so forth, although other computer architectures may additionally or alternatively be used. In the illustrated example, each service computing device 102 may include, or may have associated therewith, one or more processors 116, one or more communication interfaces 118, and one or more computer-readable media 120. Further, while a description of one service computing device 102 is provided, the other service computing devices 102 may have the same or similar hardware and software configurations and components.

Each processor 116 may be a single processing unit or a number of processing units, and may include single or multiple computing units or multiple processing cores. The processor(s) 116 can be implemented as one or more central processing units, microprocessors, microcomputers, microcontrollers, digital signal processors, state machines, logic circuitries, and/or any devices that manipulate signals based on operational instructions. For instance, the processor(s) 116 may be one or more hardware processors and/or logic circuits of any suitable type specifically programmed or configured to execute the algorithms and processes described herein. The processor(s) 116 can be configured to fetch and execute computer-readable instructions stored in the computer-readable media 120, which can program the processor(s) 116 to perform the functions described herein.

The computer-readable media 120 may include volatile and nonvolatile memory and/or removable and non-removable media implemented in any type of technology for storage of information such as computer-readable instructions, data structures, program modules, or other data. For example, the computer-readable media 120 may include, but is not limited to, RAM, ROM, EEPROM, flash memory or other memory technology, optical storage, solid state storage, magnetic tape, magnetic disk storage, storage arrays, network attached storage, storage area networks, cloud storage, or any other medium that can be used to store the desired information and that can be accessed by a computing device. Depending on the configuration of the service computing device 102, the computer-readable media 120 may be a tangible non-transitory medium to the extent that, when mentioned, non-transitory computer-readable media exclude media such as energy, carrier signals, electromagnetic waves, and/or signals per se. In some cases, the computer-readable media 120 may be at the same location as the service computing device 102, while in other examples, the computer-readable media 120 may be separate or partially remote from the service computing device 102.

The computer-readable media 120 may be used to store any number of functional components that are executable by the processor(s) 116. In many implementations, these functional components comprise instructions, applications, or other programs that are executable by the processor(s) 116 and that, when executed, specifically program the processor(s) 116 to perform the actions attributed herein to the service computing device 102. Functional components stored in the computer-readable media 120 may include a service application 122, which may include one or more computer programs, applications, executable code, computer-readable instructions, or portions thereof. For example, the service application 122 may be executed by the processors(s) 116 for performing various data classification tasks, as well as data storage and retrieval tasks, such as for interacting with the client devices 108, storing data 124 for the client devices in the storage 104, retrieving data 124 for the client devices 108, and/or for providing the client devices 108 with access to stored data 126 stored in the storage 104. For instance, the service application 122 may configure the service computing device(s) 102 to provide one or more services to the client computing devices 108. In some cases, the functional component(s) may be stored in a storage portion of the computer-readable media 120, loaded into a local memory portion of the computer-readable media 120, and executed by the one or more processors 116.

In addition, the computer-readable media 120 may store data and data structures used for performing the functions and services described herein. For example, the computer-readable media 120 may store data, metadata, data structures, and/or other information generated by and/or used by the service application 122. For instance, the service computing device(s) 102 may store and manage a discovery cache 128 that may include a plurality of tag classification models 127 and a plurality of field classification models 129. For example, the field classification model 129 may include field fingerprints (FPs) 130 and other data 131, and the tag classification model 127 may include tag fingerprints (FPs) 132 and other data 133, as described additionally below. In addition, the service computing device(s) 102 may store a metadata repository 134 of metadata that corresponds to at least a portion of the stored data 126, such as including a metadata glossary 135 having classification information for the stored data 126.

Each service computing device 102 may also include or maintain other functional components and data, which may include an operating system, programs, drivers, etc., and other data used or generated by the functional components. Further, the service computing device(s) 102 may include many other logical, programmatic, and physical components, of which those described above are merely examples that are related to the discussion herein. Additionally, numerous other software and/or hardware configurations will be apparent to those of skill in the art having the benefit of the disclosure herein, with the foregoing being merely one example provided for discussion purposes.

The communication interface(s) 118 may include one or more interfaces and hardware components for enabling communication with various other devices, such as over the network(s) 106. Thus, the communication interfaces 118 may include, or may couple to, one or more ports that provide connection to the one or more network(s) 106 for communication with the storage(s) 104 and the client device(s) 108. For example, the communication interface(s) 118 may enable communication through one or more of a LAN (local area network), WAN (wide area network), the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein. In addition, for increased fault tolerance, the communication interfaces 118 of the service computing device(s) 102 may include redundant network connections to each of the network(s) 106 to which the service computing device(s) 102 is coupled.

The network(s) 106 may include any suitable communication technology, including a WAN, such as the Internet; a LAN, such as an intranet; a wireless network, such as a cellular network, a local wireless network, such as Wi-Fi, and/or a short-range wireless communications, such as BLUETOOTH®; a wired network including Fibre Channel, fiber optics, Ethernet, or any other such network, a direct wired connection, or any combination thereof. Thus, the network(s) 106 may include wired and/or wireless communication technologies. Components used for the network(s) 106 can depend at least in part upon the type of network, the environment selected, desired performance, and the like. The protocols for communicating over the network(s) 106 herein are well known and will not be discussed in detail. Accordingly, the service computing device(s) 102 is able to communicate with the storage(s) 104 and the client device(s) 108 over the network(s) 106 using wired and/or wireless connections, and combinations thereof.

Each client device 108 may be any suitable type of computing device such as a desktop, workstation, server, laptop, tablet computing device, mobile device, smart phone, wearable computing device, or any other type of computing device able to send data over a network. For instance, the client device(s) 108 may generate data 124 that is sent to the service computing device(s) 102 for data storage, backup storage, long term remote storage, or any other sort of data storage. In some cases, the client device(s) 108 may include hardware configurations similar to that described for the service computing device 102, but with different data and functional components to enable the client device(s) 108 to perform the various functions discussed herein. In some examples, a user may be associated with a respective client device 108, such as through a user account, user login credentials, or the like. Each client device 108 (1)-108(m) may access one or more of the service computing devices 102 through a respective instance of a client application 136(1)-136(m), such as a browser, web application, or other application executed on the client device 108. For instance, the client application 136 may provide a graphical user interface (GUI), a command line interface, and/or may employ an application programming interface (API) for communicating with the service application 122 on a service computing device 102. Furthermore, while one example of a client-server configuration is described herein, numerous other possible variations and applications for the computing system 100 herein will be apparent to those of skill in the art having the benefit of the disclosure herein.

The storage(s) 104 may provide storage capacity for the system 100 for storage of data, such as file data or other object data, and which may include data content and metadata about the content. The storage(s) 104 may include storage arrays such as network attached storage (NAS) systems, storage area network (SAN) systems, cloud storage, storage virtualization systems, or the like. Further, the storage(s) 104 may be co-located with one or more of the service computing devices 102, or may be remotely located or otherwise external to the service computing device(s) 102.

In the illustrated example, the storage(s) 104 includes one or more storage computing devices referred to as storage controller(s) 138, which may include one or more servers or any other suitable computing devices, such as any of the examples discussed above with respect to the service computing device 102. The storage controller(s) 138 may each include one or more processors 142, one or more computer-readable media 144, and one or more communication interfaces 146. For example, the processor(s) 142 may correspond to any of the examples discussed above with respect to the processors 116, the computer-readable media 144 may correspond to any of the examples discussed above with respect to the computer-readable media 120, and the communication interfaces 146 may correspond to any of the examples discussed above with respect to the communication interfaces 118.

Further, the computer-readable media 144 of the storage controller 138 may be used to store any number of functional components that are executable by the processor(s) 142. In many implementations, these functional components comprise instructions, modules, or programs that are executable by the processor(s) 142 and that, when executed, specifically program the processor(s) 142 to perform the actions attributed herein to the storage controller 138. Functional components stored in the computer-readable media 144 may include a storage management program 148, which may include one or more computer programs, applications, executable code, computer-readable instructions, or portions thereof. For example, the storage management program 148 may control or otherwise manage the storage of the stored data 126 in a plurality of storage devices 150 coupled to the storage controller 138.

In some cases, the storage devices 150 may include one or more arrays of physical storage devices. For instance, the storage controller 138 may control one or more arrays, such as for configuring the arrays in a RAID (redundant array of independent disks) configuration or other desired storage configuration. In some examples, the storage controller 138 may present logical units based on the physical devices to the service computing devices 102, and may manage the data stored on the underlying physical devices. The storage devices 150 may include any type of storage device, such as hard disk drives, solid state devices, optical devices, magnetic tape, and so forth, or combinations thereof. Alternatively, in other examples, one or more of the service computing devices 102 may act as the storage controller, and the storage controller 138 may be eliminated.

In the illustrated example, the service computing device(s) 102 and storage(s) 104 may be configured to act as a data storage system for the client devices 108. The service application 122 on the service computing device(s) 102 may be executed to receive and store data 124 from the client devices 108 and/or subsequently retrieve and provide the data 124 to the client devices 108. The system 100 may be scalable to increase or decrease the number of service computing devices 102 in the system 100, as desired for providing a particular operational environment. The amount of storage capacity included within the storage(s) 104 can also be scaled as desired. Further, the service computing devices 102 and the client devices 108 may include any number of distinct computer systems, and implementations disclosed herein are not limited to a particular number of computer systems or a particular hardware configuration.

In some examples, the stored data 126 may include a huge amount of data, at least some of which may be stored as data sets 152. For instance, a data set 152 may include a collection of data and one or more corresponding data fields. The data field may be associated with the data of the data set in structured or semi-structured data resource, such as in a table, comma separated value (csv) file, json, xml, parquet, or other data structure. As one example, a column in a csv file may be a field, and may accompany, correspond to, or otherwise be associated with a particular data set 152.

In some examples, the terms "classification" and "tag" may be used interchangeably. For example, suppose that a given data field is "classified" as a social security number. The data field may also be referred to as being "tagged" as a social security number.

Furthermore, in implementations herein, a data field or a data file may be classified and represented by one or more associated classifications in a data catalog referred to herein as the metadata glossary 135 that may be included in the metadata repository 133. For instance, the metadata glossary 135 may include metadata about each data file or other data set 152 stored in the stored data 126. The metadata glossary 135 may allow annotations provided by users to be retained as part of the metadata content. These annotations can then be used to enable searching and data understanding. The implementations of tagging and providing annotations described herein may systematically progress towards increasingly higher levels of accuracy. This can lead to a metadata glossary 135 that is crowd-sourced. This way the glossary 135 can be created bottom-up. The content of the glossary created in a bottom-up manner is crowd sourced in a fashion that can capture and maximize the knowledge of the users without burdening them.

Once there is some content in the metadata glossary 135, it can be leveraged to enable users to produce more normalized precise tagging and annotation of data in the storage. Tagging two different fields in two different files or databases with the same term can mean that these fields represent the same item. By employing the algorithm discussed below that takes into consideration both supportive and contradictory features, and positive and negative feedback from users, the tag classification models 127 for the classified data sets can be iteratively updated to lead to continually increasing accuracy of the data classifications.

The service application 122 may include a classification algorithm, as discussed additionally below, that may be executed by the processor(s) 116 to automatically determine classification associations between the data sets based at least in part on other data sets already manually associated with other classifications. The result of the classification algorithm is that a classification is associated with one or more data sets (also referred to as "fields" or "columns" in some examples). The term "classification association" may refer to the association of a classification (tag) to respective data sets (fields).

The service application 122 may be executed to perform systematic organization of the stored data 126 so that the users of the client devices 108 can reliably and efficiently access desired data without requiring the users to have knowledge of the underlying data organization. This may include performing an automatic inventory of all files or other data sets 152, which may include capturing the lineage, format, and profile of each file or other data set 152 and storing this information in the metadata repository 134. In some cases, the system 100 may deduce the meaning of values in the fields of a data set 152 by analyzing other data sets 152 that have field names with meaningful tags and/or that have been tagged by a user with meaningful tags.

In some implementations, for a given data classification (tag) "T", the system may access or may generate a feature set "$\Omega_T$" for a tag classification data model 127 "$D_T$" of the classification T, and a significance vector "$A_T$" for the features of the classification model $D_T$. For instance, for the tag classification model 127 $D_T$, the feature set $\Omega_T$ may include a plurality of features $c_i$ that are relevant to the data in the classification T, e.g., $$\Omega_T=\{c_1,c_2,\ldots c_n\}$$

Several example data features may include {field_name, data value, pattern, . . . }, with the particular features being dependent at least in part on the data itself.

Further, the tag classification model 127 $D_T$ of the classification T may include computing the features $c_i$ on $D_T$, e.g., $c_i(D_T)$ and may be calculated based of selected reference fields (seeds) and curation results (accepted and rejected classifications). For example, the classification model $D_T$ may enable classification and discovery of the data within a large volume of data classified using the metadata glossary 135. The tag classification model 127 "$D_T$" for classification T for an individual data set may be calculated based on selected reference fields (also referred to herein as "seeds") and curation results (accepted and rejected classifications). In some examples, tag classification model 127 may include aggregated tag fingerprints 132 for the reference data. In addition, the tag classification model may include other data 133, which may include and a feature set based on the tag fingerprint 132 and other metadata that may be useful for classification model matching with field classification models 129 of other data sets. Further, the tag classification model 127 may be updated based on curation inputs received from users. As mentioned above, the tag classification model 127 may be similar to the field classification model 129 (i.e., both use the fingerprints of data of the same size) which enables matching of data based on matching the respective fingerprints 132 and 130 of the respective classification models 127 and 129 of different data sets 152.

In addition, the significance vector of a respective tag classification model 127 $D_T$ may indicate the significance of the similarly between features of classified data and unclassified data. Thus, the significance vector may be expressed as, e.g., $$A_T=\{a_1,a_2,\ldots a_n\}$$

where $a_i$ indicates the significance of similarity on feature $c_i$.

In addition, given a known field "F" to be classified with a field classification model 129 $D_F$, the system may calculate a confidence value as to whether F may be classified as T, e.g., whether data corresponding to F should be classified the same as data corresponding to T. To help make this determination, the system may determine a feature similarity score vector, "$W_{F,T}$", e.g., $$W_{F,T}=\{\text{sim\_}c_1(D_T,D_F),\text{sim\_}c_2(D_T,D_F),\ldots \text{sim\_}c_n(D_T,D_F)\}$$

which may be simplified as $$W_{F,T}=\{s_1,s_2,\ldots s_n\}$$

where $s_i=\text{sim\_}c_i(D_T, D_F)$. As one example, the similarly score vector may be calculated as a number, and the higher the number, the greater the similarity between respective features of F and T.

Based on the feature similarity score vector, the system may determine a similarity score "Score(F,T)" between features of the classified data and the unclassified data, e.g., $$\text{Score}(F,T)=W_{F,T}\times A_T=a_1\times d_1+a_2\times d_2+\ldots +a_n\times d_n$$

One of the goals of the classification techniques herein is to achieve higher confidence levels based on the similarity score(F,T) calculated above, e.g., by continually and iteratively improving the similarity between data classified in the system 100. For instance, the tag classification models 127 may be updated based on updates to the tag fingerprints 132 and other data 133, such as collected statistics. The updates may be performed in a feature specific manner for two classes of features, namely supportive and contradictory. Furthermore, the significance vector $A_T$ affects the confidence level for classification associations. For example, different updates to the tag classification model 127 and to the similarity score(F,T) are performed based on the significance vector for accepted associations and rejected associations and for supportive and contradictory features, e.g., $a_i$=f_accepted(av, score, reward) for supportive features and $a_i$=f_rejected(av, score, penalty) for contradictory features, as discussed additionally below, e.g., with respect to FIG. 3.

Furthermore, in some examples herein fingerprints (also referred to as "signatures" in some examples), i.e., tag fingerprints 132 and field fingerprints 130 may be calculated for the data sets herein. Additionally, the tag fingerprints 132 and the field fingerprints 130 for a plurality of data sets may be matched to each other with a calculated probability. For instance, a field fingerprint 130 may be a fixed size metadata artifact or other metadata data structure that may be generated for a data set (also referred to as a "field" or "column" in some examples) based on a plurality of data properties of the data in the data set. The field fingerprint 130 may be calculated for the column of data based on a plurality of data properties of the data, such as, but not limited to: top K most frequent values; bloom filters; top K most frequent patterns; top K most frequent tokens; length distribution; minimum and/or maximum values; quantiles; cardinality; row counts; null counts; numeric counts, and so forth. Further, the foregoing data properties are merely examples that may vary in actual implementations, such as depending at least in part on the data type of the data. The tag fingerprints 132 may include one or more field fingerprints of representative data, e.g., aggregated fingerprints.

The fingerprints, i.e., the field fingerprints 130 and the tag fingerprints 132, are configured such that multiple field fingerprints 130 may be aggregated into a single tag fingerprint 132. For example, suppose that field $F_1$ is represented by fingerprint $FP_1$ and field $F_2$ is represented by fingerprint $FP_2$, then the aggregate of these two fingerprints $FP_{12}=FP_1+FP_2$ may represent both fields $F_1$ and $F_2$. This feature of the fingerprints herein provides the ability to accumulate, in the tag fingerprints 132, the supportive and contradictory fingerprints obtained through the curation process.

The classification models used in the examples herein may include the field classification models 129 and the tag classification models 127. For example, the field classification models 129 may be generated during profiling of new or otherwise unclassified received data, e.g., as discussed with respect to block 204 of FIG. 2 below. During profiling, the system may employ multiple different techniques and third-party tools to create a set of data properties as discussed above for generating the field fingerprints 130, such as: bloom filters for large cardinality data; a stream summary, e.g., top K most frequent values, top K most frequent patterns, top K most frequent tokens, length distribution, minimum and/or maximum values, quantiles, cardinality, row counts, null counts, numeric counts; T-digest quantiles for numeric data; hyperloglog for cardinality estimation, and so forth. In some cases, during profiling, the system may use APACHE SPARK APIs, or other suitable techniques to parse structured or semi-structured data records, one by one. The SPARK APIs may perform distributed computing, so the fingerprint may be calculated for multiple data splits. Thus, in some examples, the field fingerprints 130 may be a probabilistic model of a fixed size of the corresponding data set, regardless of the size of the data set. Further, in some cases, the field fingerprints 130 may include one or more bitmaps representative of at least a portion of the data. Because the fingerprints herein are able to be combined together (aggregated) into a single aggregated fingerprint, the single aggregated fingerprint is able to represent multiple data sets in one classification model.

The tag classification model 127 includes a tag fingerprint 132 which may be aggregated from one or more field fingerprints 130, such as aggregated reference field fingerprints and/or aggregated blacklist fingerprints as curation results for contradictory values, patterns, and/or tokens, as discussed below. The structure of the tag fingerprint 132 included in each tag classification model 127 may be identical or similar to the field fingerprints in field classification model, which enables comparison and matching of tag fingerprints 132 with the field fingerprints 130 of various different field classification models during classification association as discussed with respect to FIG. 3 below. In addition to a tag fingerprint 132, each tag classification model 127 may include other data 133, such as name-related metadata, which may include matching field names, tag names, mismatched names, descriptions, statistics of previous classification runs, and statistics of curation activities by users. Further, the field classification model 129 may also include other data 131 in addition to the field fingerprint 130, such as field name or description. The classification model properties of $D_F$ and $D_T$ may be used in different ways for specific feature evaluation. Furthermore, different properties may be used for contradictory and supportive features in the tag classification models 127, as discussed additionally below.

As one example, the field fingerprint 130 of a column of data may be determined based on collection of the data properties, such as discussed above. The tag fingerprint can be determined from one or more field fingerprints 130 of one or more reference data determined for one or more classifications, respectively, selected by a user as one or more seeds for the data set. Subsequently, a field fingerprint 130 of a column that does not have a field label might then be matched with the classification based on matching of the field fingerprints 130 to provide a ranked list of possible matching classification associations along with computed confidence levels. Thus, the particular field can be associated with matching classifications.

In addition, two types of tag fingerprints 132 may be employed, namely supportive model tag fingerprints and contradictory model tag fingerprints. The tag fingerprints 132 may also be fixed size metadata artifacts or other metadata data structures that may be generated based on a plurality of data properties. For instance, the supportive model tag fingerprints may be generated based on, e.g., aggregated seed field fingerprints; accepted names; and discovery statistics. Further, contradictory model fingerprints may be generated based on, e.g., values blacklist fingerprint; token blacklist fingerprint, pattern blacklist fingerprint; and rejected names. For instance, "values" may include actual values from the data sets, such as one value from each row corresponding to the field. A "pattern" may include a representation of a value where, as one example, each number is replaced with "N", each alpha character is replaced with "A", and each separator character (not alpha and not numeric) is preserved as is. Further, for a "token", the text of a value may be tokenized and stop words may be removed.

The backlist fingerprints herein may include fingerprints created from data fields rejected through user curation activity. The system may extract specific data and may execute the profiling routine, e.g., as discussed below with respect to block 204 of FIG. 2, to create corresponding fingerprints for the extracted data. The blacklist fingerprints may be part of the other data 133 in the tag classification model 127 for the corresponding data. For instance, the value blacklist may be generated by accumulating known values from rejected fields that do not belong to reference fields. The pattern blacklist may be generated by accumulating known patterns from rejected fields that do not belong to the reference fields. Further, the token blacklist may be generated by accumulating known tokens from rejected fields that do not belong to reference fields.

In addition, in some cases the system may collect different statistics, depending on the implementation, and may include some statistics in the other data 133 for the tag classification models 127. Examples of discovery statistics may include an Average Score $sim\_c_i(D_T, D_F)$, collected per feature, which may be used to dynamically calculate feature acceptance while ignoring outliers. Further, for some matching features, the system may collect information about other classifications that also match on the matching feature but were otherwise rejected. For instance, this situation may occur when different classifications have overlapping reference data. The statistics collected may help the system to make decisions regarding incompatible classifications (e.g., based on rejection statistics). Additional statistics may include the number of acceptances and rejections. In some implementation this information may be used to correct penalties and reward adjustment of the tag classification model 127. Additionally, specific implementations may add more statistics to use in specific contradictory and supportive features. Further, the foregoing data properties are merely examples that may vary in actual implementations, such as depending at least in part on the data type of the data.

The system herein may designate a feature set that is extensive and meaningful with regard to a given data classification by allowing both supportive features and contradictory features to be taken into account. For instance, the tag classification model 127 may contain both, supportive features and contradictory features based on reference data semantics. Semantics may be detected during the profiling operation. This may reflect the nature of the data and may dictate the set of the matching features that are selected. According to some implementations, semantics that are detected may include one or more of: STRING, WHOLE_NUMBER, REAL_NUMBER, MONEY, PERCENT, ID, CODE_NUMERIC, CODE_STRING, MEASUREMENT, ANONYMOUS_NUMBER, ANONYMOUS_STRING, ANONYMOUS_COMPOSITE, BOOLEAN, FREE_TEXT, LONG_FREE_TEXT, and TEMPORAL. In some cases, the anonymous data may be accomplished with a single character, e.g., ANONYMOUS_STRING. short integer (e.g., 1-3 digits), ANONYMOUS_NUMBER, and may be configurable. Further, an ANONYMOUS_COMPOSITE may be a combination of anonymous numbers and/or strings. Additionally, some examples, may require that a high (configurable) percent of the data comply with the semantics to be declared as semantics. For example, if a tag classification model 127 is created for FREE_TEXT, then numeric comparison features are useless, and so should not be offered.

Furthermore, to upkeep the tag classification model 127 that adapts to enterprise data culture and conventions, the algorithm discussed additionally below may iteratively adjust the tag classification model 127 by learning based on received user curation actions. In addition, based on supportive and contradictory features, and positive and negative feedback from user, the algorithm may update the tag classification model 127 differently. User curation may impact all components of the tag classification model 127. For example, (a) aggregated fingerprints may be affected through new "accepted" associations that may impact classification fingerprints and/or through "rejected" associations that may impact blacklist fingerprints; (b) feature sets based on fingerprint data may be impacted, such as by an additional seed that may change the kind of data that is used as a seed, so the feature set for the tag fingerprint 132 may change accordingly; (c) significance adjustments for features may change based on accepted and rejected curation activities that influence the significance vector; and (d) the statistics accumulated from user curation activity may also impact feature evaluation when the accumulated statistics are used for feature evaluation.

Additionally, to ensure that the significance vector leads to more accurate data classification, the algorithm may (1) allow both positive and negative values in the significance vector; and (2) iteratively update the significance vector by learning from user actions, both positive and negative. This adjustment is different between supportive feedback and negative feedback. In addition, the algorithm herein may include calculating a confidence level for each data classification that may indicate a degree of confidence that the data is classified in the correct data class.

Furthermore a user of the system 100 may be able to perform any of a plurality of user actions with respect to the data that is classified in a particular data class, such as (1) accept the classification; (2) reject the classification; (3) add more reference data; or (4) change the accuracy of the classification process. Additionally, after tags are generated and/or curated for a data set, e.g., such as by a user accepting or rejecting a classification association, the classification process may be repeated to (1) obtain updated results; or (2) classify new incoming data.

Figure 2:
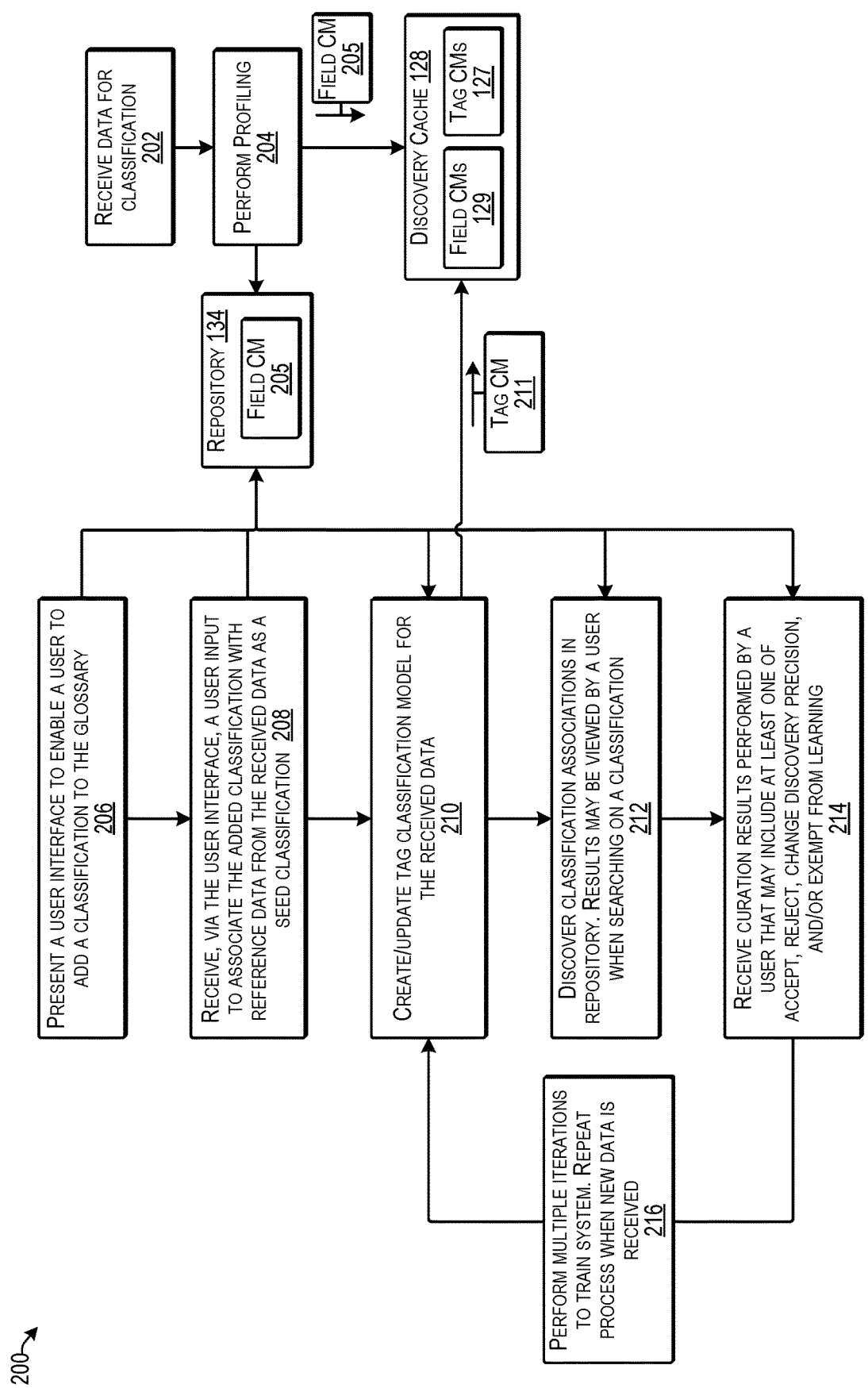
FIG. 2 includes a flow diagram illustrating an example process for classifying data according to some implementations.
Figure 3:
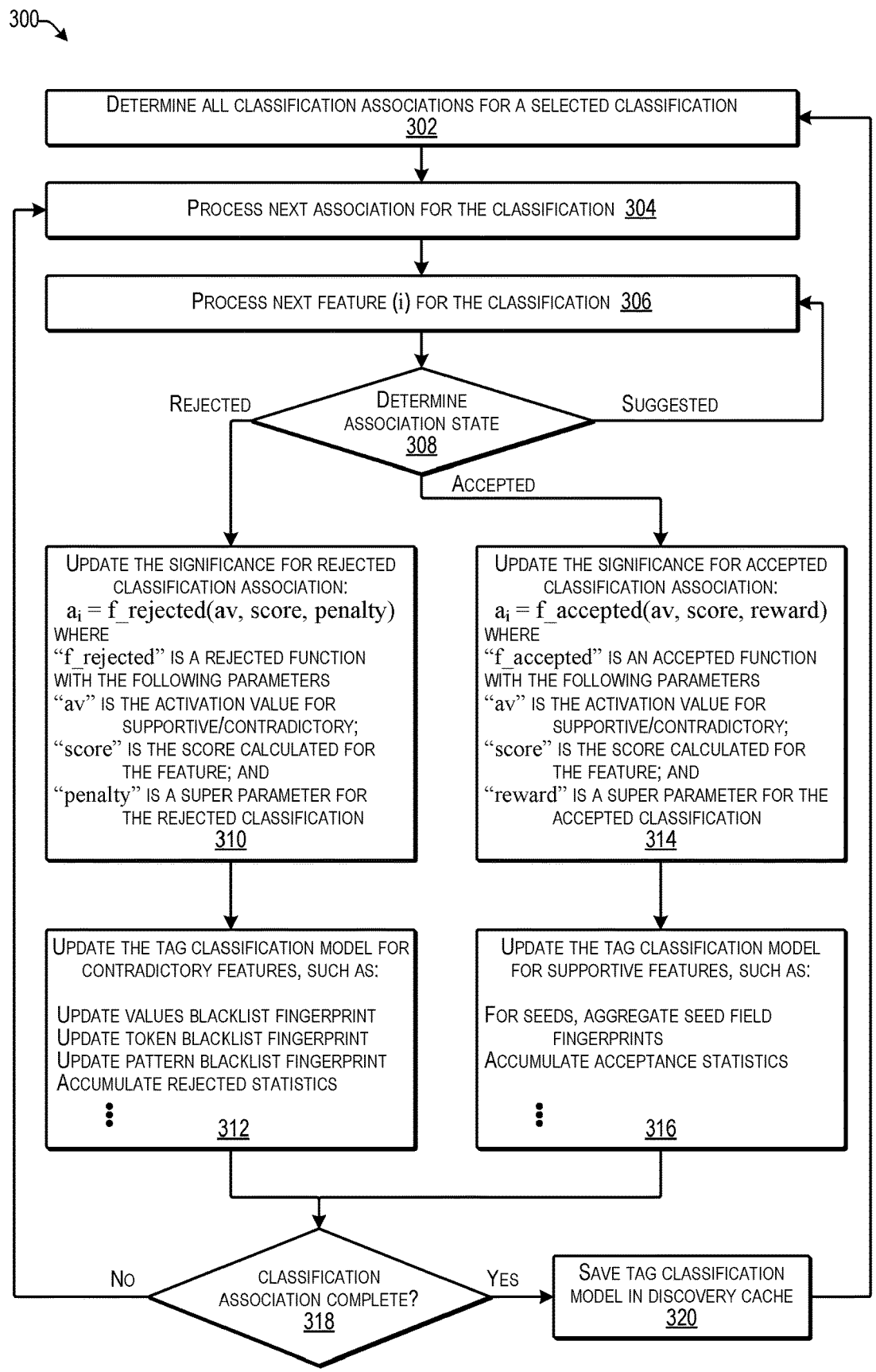
FIG. 3 is a flow diagram illustrating an example process for determining classification associations according to some implementations.
Figure 4:
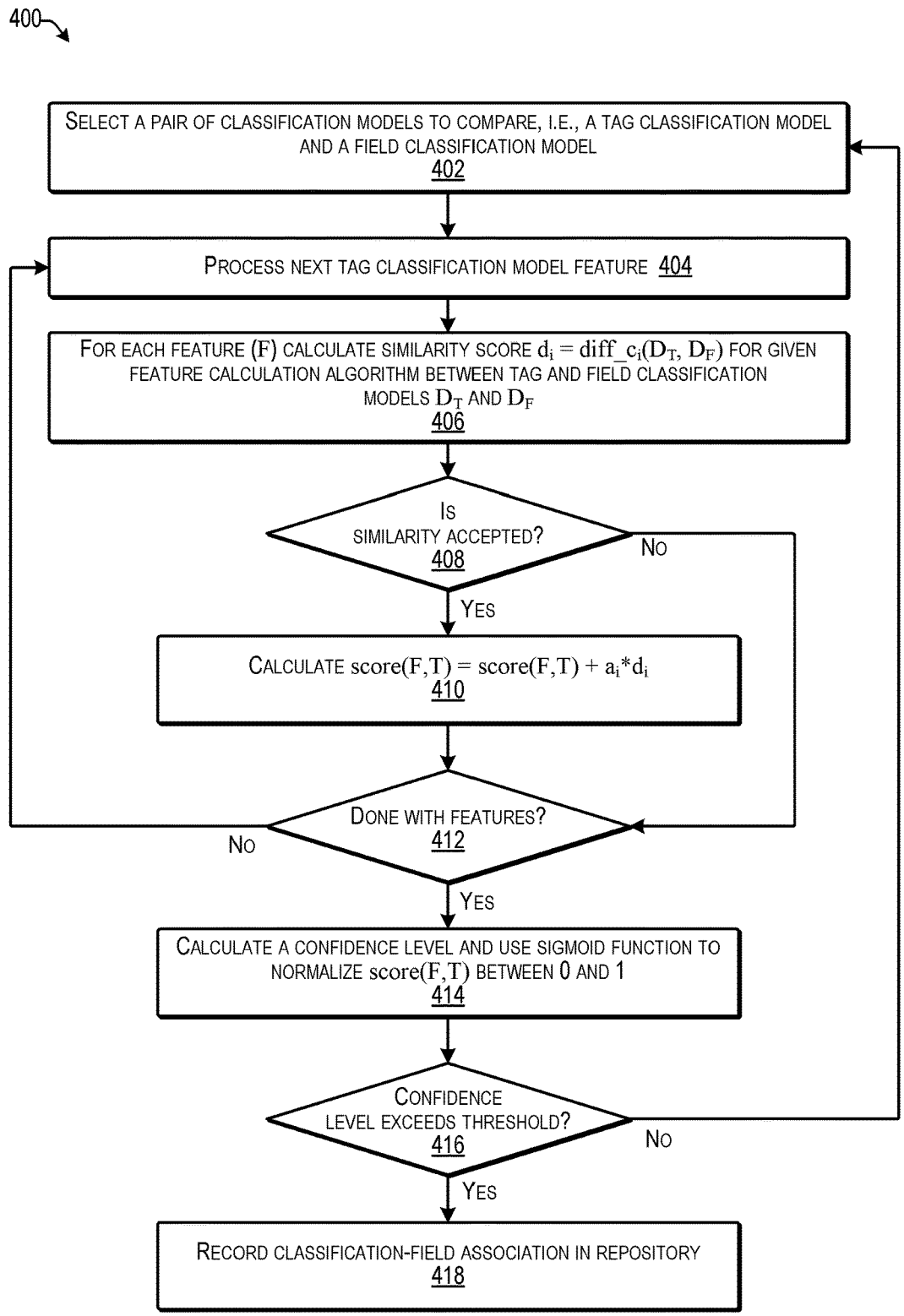
FIG. 4 is a flow diagram illustrating an example process for determining classification associations according to some implementations.

The algorithm discussed additionally below, e.g., with respect to FIGS. 2-4 are not dependent on a large number of user curation interactions. To the contrary, the algorithm herein is able to function accurately with limited user curation actions. For example, the process of accessing and correcting results (referred to as "curation") can be time consuming Additionally, in some cases, data velocity and variety can significantly complicate human visual analysis. Further, in some examples herein, the classification may be context free and does not need to take into account the data environment (e.g., surrounding data) or other context in which the classification takes place.

The processes executed by the system 100, examples of which are discussed with respect to FIGS. 2-4, may provide a plurality of results, such as (1) data is classified (e.g., tagged and/or labeled) automatically; (2) data is classified in multiple iterations, and each iteration may take into account any user curation actions that have taken place between that iteration and a prior iteration; (3) after multiple iterations, the confidence level calculations may improve such that there are (a) fewer false positives or incorrectly classified data; and (b) there is an insignificant increase in false negatives or data that cannot be classified. In addition, the results of the classification associations may be presented in the order of confidence, e.g., with the results that have the highest confidence levels being presented first. Accordingly, implementations herein may provide significant automation of data classification and also may dramatically shorten the time required for performing data cataloging.

The system 100 is not limited to the particular configuration illustrated in FIG. 1. This configuration is included for the purposes of illustration and discussion only. Various examples herein may utilize a variety of hardware components, software components, and combinations of hardware and software components that are configured to perform the processes and functions described herein. In addition, in some examples, the hardware components described above may be virtualized. For example, some or all of the service computing devices 102 may be virtual machines operating on the one or more hardware processors 116 or portions thereof, and/or other service computing devices 102 may be separate physical computing devices, or may be configured as virtual machines on separate physical computing devices, or on the same physical computing device. Numerous other hardware and software configurations will be apparent to those of skill in the art having the benefit of the disclosure herein. Thus, the scope of the examples disclosed herein is not limited to a particular set of hardware, software, or a combination thereof.

FIGS. 2-4 include flow diagrams illustrating example processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks and systems described in the examples herein, although the processes may be implemented in a wide variety of other environments, frameworks and systems.

FIG. 2 includes a flow diagram illustrating an example process 200 for classifying data according to some implementations. For example, the process 200 may be executed by one or more of the service computing devices 102 or other suitable computing devices, such as by execution of the service application 122. For example, through execution of the service application 122, the system may receive and classify data At 202, the computing device may receive data to be classified. For example, the received data may be new data received from a client device 108 or may be data received from any of various other data sources such as storages, servers, databases, computer programs, or the like. The received data may be structured data or semi-structured data, such as in a table, csv file, json, xml, parquet, or other data structure.

At 204, the computing device may perform profiling of the received data. During profiling, the system may generate a field fingerprint and a corresponding field classification model (CM) 205 for the received data. For instance, as discussed above, the computing device may employ multiple different techniques and/or third-party tools to create a set of data properties for the new data as discussed above, such as: top K most frequent values; bloom filters; top K most frequent patterns; top K most frequent tokens; length distribution; minimum and/or maximum values; quantiles; cardinality; row counts; null counts; numeric counts, and so forth. In some cases, during the profiling, the system may use APACHE SPARK APIs, or other suitable techniques to parse structured or semi-structured data records, e.g., one by one. The SPARK APIs may be used to perform distributed computing, so the fingerprint may be calculated for multiple data splits. Because the fingerprints herein are able to be aggregated into aggregated fingerprints, the local results of distributed computing (profiling) may be aggregated into a single final field fingerprint (corresponding to the field classification model 205). For example, during profiling, the system may generate a field classification model 205 for the received data and may add the field classification model 205 to the metadata repository 134. The field classification model 205 may also be stored with the field classification models 129 in the discovery cache 128.

At 206, the computing device may present a user interface to enable a user to add, via a user input to the user interface, a classification (tag) as a classification for the received data to add to the metadata glossary 135. For example, the service application may generate a user interface to present the metadata currently in the metadata glossary to enable the user to enter a classification name. The user interface may be provided via a web application, website, proprietary client application, or through any other desired technique. The user may use the user interface to manually determine and enter the classification for the received data and associate the classification with the received data to use as a seed, as discussed at 208 below. The system may then perform processing for determining potentially a large volume of classification associations for the received data based on the classification and one or more selected seed(s), as discussed at 210 and 212 below.

At 208, the computing device may receive, via the user interface, a user input to associate the added classification with reference data from the received data set as a seed classification for the received data. For example, the system may use the seed to attempt to match the received data to other data sets already classified in the system. The seed selection may be performed differently according to several different scenarios. For example, if the user already knows where good reference data is located, the user may create a classification association with the reference data and select the reference data for use during discovery. As another example, if the reference data is spread between multiple data sets, the user may create an association between classification and each reference field (data set) and select to use all the associated reference fields during discovery. The classification model of each selected reference field may be aggregated in the one classification model DT. The single classification model DT may be used to discover associations with other fields in the stored data 126. As yet another example, if the user does not know where suitable representative data is located, the user may search for similar data by name, such as field name, or may search in similar related data resources. For instance, the user may attempt to locate clean data with higher cardinality. The user may use a located field to create a classification association and select the corresponding data to use during discovery. As discussed additionally below, following several iterations of tag automation and user curation, user accept and/or reject curation inputs may improve the classification results. Additionally, better reference data may be located during the iterative process of curation discussed below.

For the received data set, the user may attempt to select a field with the best possible relevant and representative data (referred to herein as the reference or seed). It is desirable for this field to represent the classification as precisely as possible. As mentioned above, the reference data may typically include data that is more representative or the most representative of a data classification to which the selected data corresponds. Thus, the data classification for the new data may be represented by a representative example that is used as the seed, and the user may select the most representative example available for each data classification that the new data is associated with. The system may then automatically attempt to find all other data sets that are similar to seed data set. Additionally, in some examples, the classification model for the data set may have multiple seeds that can be used for determining classification associations. Further, while the initial quality of the classification may depend on the quality of the selected seed, over time, based on the curation results, classification model should improve and provide increasingly accurate classification results.

At 210, the computing device may create or update the tag classification model for the received data. For example, following execution of block 208, the computing device may create the tag classification model 211 for the received data based at least on the reference data identified in block 208. For example, the computing device may create the tag classification model 211 based on classification association analysis, e.g., as discussed additionally below with respect to FIG. 3. The tag classification model 211 may be stored to the discovery cache 128. Following execution of block 216, the computing device may update the tag classification model 211 based on classification associations and any user curation results.

At 212, the computing device may discover classification-field associations. For example, associations between the tag classification model and a plurality of field classification models can be searched to obtain results of the classification in an order of calculated confidence. For example, the system may determine a classification association by associating the classification represented by a tag classification model 211 for the received data with a field, represented by a field classification model 129 of any similar or otherwise matching data sets. In addition, the computing device may discover classification associations based, e.g., on a cross product between field classification models and tag classification models as discussed additionally below with respect to FIG. 3 and FIG. 4.

At 214, the computing device may receive, via the user interface, curation results performed by a user that may include at least one of "accept", "reject", "change discovery precision", and/or "exempt from learning".

At 216, the computing device may perform multiple iterations of operations 210-214 to train the system to associate the data with classifications with increasing accuracy. For example, periodically and/or based on receiving one or more curation actions from one or more user inputs and/or based on receiving new data, the system may repeat the process of blocks 210 and 212 for determining classification associations for the curated data and/or any new data.

FIG. 3 is a flow diagram illustrating an example process 300 for determining classification associations according to some implementations. In some examples, the process 300 may be executed by one or more of the service computing devices 102 or other suitable computing devices.

At 302, the computing device may initiate a process to determine all classification associations for a selected classification. Further, for an updated tag classification model based on a user curation action, the process may determine other classification associations with the updated data based on the input received from the user (e.g., accepted, rejected, etc.).

At 304, the computing device may process a next association for the classification.

At 306, the computing device may process a next feature (i) for the classification.

At 308, the computing device may determine an association state for the feature, which, in this example, may be one of "accepted", "rejected", or "suggested". For instance, "accepted" may indicate that a user has indicated acceptance of the association of the feature with a data classification; "rejected" may indicate that the user has indicated that the association of feature with the data classification is rejected, e.g., is not correct; and "suggested" may be an auto-generated association that indicates that the user has not expressed any judgment about the quality of the association (e.g., has neither actively accepted nor actively rejected the association of the feature with the data classification). If the association state is "rejected", the process goes to 310. If the association state is "accepted", the process goes to 314. If the association state is "suggested", the process goes to 306 to process a next feature for the classification currently being processed.

At 310, when the association state for the classification feature is rejection rejected the computing device may update the significance for the rejected association. For example, for the selected feature "i", the significance for rejected association may be determined by $a_i$=f_rejected(av, score, penalty), where "f_rejected" is a rejected function with the following parameters: "av" is the activation value for supportive/contradictory; "score" is the score calculated for the feature; and "penalty" is a super parameter for the rejected classification that may be used to define the velocity of the approach. As one example, the greater the value of the "penalty" super parameter, the greater the influence of the rejected values on Score(F,T) through the decreased values of the significance vector A.

At 312, the computing device may update the model for contradictory features, such as: updating values to blacklist the fingerprint; updating a token to blacklist the fingerprint; updating a pattern to blacklist the fingerprint; and/or accumulating rejected statistics for the feature.

At 314, when the association state for the classification feature is "accepted", the computing device may update the significance for the accepted association. For example, for the selected feature "i", the significance for accepted association may be determined by $a_i$=f_accepted(av, score, reward), where "f_accepted" is an accepted function with the following parameters: "av" is the activation value for supportive/contradictory; "score" is the score calculated for the feature; and "reward" is a super parameter for the accepted classification that may be used to define the velocity of the approach. As one example, the greater the value of the "reward" super parameter, the greater the influence of the accepted values on Score(F,T) through the increased values of the significance vector A.

At 316, the computing device may update the model for supportive features, such as: for seeds, aggregating seed field fingerprints; and/or accumulating acceptance statistics.

At 318, the computing device may determine whether the classification association analysis is complete. if so, the process goes to 320. If not, the process goes to 304 to process a next classification association.

At 320, the computing device may save the tag classification model in the discovery cache, and the process may go to 302 to process a next classification, if any.

FIG. 4 is a flow diagram illustrating an example process 400 for determining classification-field associations according to some implementations. In some examples, the process 400 may be executed by one or more of the service computing devices 102 or other suitable computing devices.

At 402, the computing device may select a pair of classification models to compare, i.e., a tag classification model and a field classification model. As one example, the computing device may determine a cross product of the tag classification model and the field classification model.

At 404, the computing device may process a tag classification model feature that has not yet been processed.

At 406, the computing device may, for each feature (F) calculate a similarity score $d_i$=diff_$c_i$($D_T$, $D_F$) for given feature calculation algorithm between the tag and field classification models $D_T$ and $D_F$, respectively.

At 408, the computing device may determine if the similarity is accepted. If so, the process goes to 410. If not, the process goes to 412 to determine if there are any more tag classification model features to process.

At 410, the computing device may calculate a similarity score, i.e., score(F,T)=score(F,T)+$a_i \times d_i$.

At 412, the computing device may determine whether all features have been processed for the tag classification model. If so, the process goes to 414. If not, the process goes to 404 to process the next classification feature.

At 414, the computing device may calculate a confidence level that the data is classified correctly. In some examples, the process may use a sigmoid function, or any of various other techniques, to normalize the score(F,T) to have a value between 0 and 1.

At 416, the computing device may determine whether the confidence level exceeds a threshold confidence level. If so, the process goes to 418. If not, the process goes to 402 to process a next pair of classification models.

At 418, when the confidence level exceeds the threshold level of confidence, the computing device may record the classification-field association in the metadata repository 133.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as program modules stored on computer-readable media, and executed by the processor(s) herein. Generally, program modules include routines, programs, objects, components, data structures, executable code, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system comprising:
one or more processors configured by executable instructions to perform operations comprising:
receiving a first data set including structured or semi-structured data;
receiving a user input to create a classification to use for the first data set;
receiving a user input to associate, in a metadata glossary, the classification with the first data set as reference data;
generating a first fingerprint for a first classification model based on a plurality of data properties of the first data set, the plurality of data properties of the first data set being determined based on at least one of top K most frequent values, top K most frequent patterns, top K most frequent tokens, length distribution, minimum and/or maximum values, quantiles, cardinality, row counts, null counts, numeric counts, T-digest quantiles for numeric data, or hyperloglog for cardinality estimation;
determining a classification association with the first data set based in part on comparing the first fingerprint of the first classification model with a second fingerprint associated with a second classification model of a second data set, the second fingerprint being determined based at least in part on a plurality of data properties of the second data set;
determining a user curation result with respect to the classification association with the first data set; and
updating the first classification model for the first data set based at least in part on the user curation result.

2. The system as recited in claim 1, wherein options available for user curation of the classification association include both an ability to accept the classification association and an ability to reject the classification association.

3. The system as recited in claim 1, wherein the user curation result is a rejection of the classification association, the operation of updating the first classification model further comprising changing the first classification model to indicate that the first data set is less similar to the second data set than previously indicated by the first classification model.

4. The system as recited in claim 3, the operations further comprising determining an updated classification association with the first data set based on the updated first classification model, the updated classification association associating the first data set with a third data set.

5. The system as recited in claim 3, the operations further comprising determining an updated significance vector for the updated first classification model, the updated significance vector indicating a decreased similarity between the first data set and the second data set.

6. The system as recited in claim 1, wherein the user curation result is an indication of acceptance of the classification association, the operation of updating the first classification model further comprising changing the first classification model to indicate that the first data set is more similar to the second data set than previously indicated by the first classification model.

7. The system as recited in claim 6, the operations further comprising determining an updated classification association with the first data set based on the updated first classification model, the updated classification association associating the first data set with a third data set.

8. The system as recited in claim 6, the operations further comprising determining an updated significance vector for the updated first classification model, the updated significance vector indicating an increased similarity between the first data set and the third data set.

9. The system as recited in claim 1, wherein the first classification model for the first data set includes the first fingerprint based of the plurality of data properties of the first data set, the operations further comprising:
receiving a user input to associate additional reference data with the first data set; and
determining an aggregated fingerprint for the first data set, the aggregated fingerprint based at least in part on combining the first fingerprint and a fingerprint representative of the additional reference data, wherein a size of the aggregated fingerprint is same as a size of the first fingerprint.

10. The system as recited in claim 9, wherein updating the first classification model is based on one or more supportive features, the supportive features comprising at least one of:
the aggregated fingerprint; or
accumulated indications of acceptance of one or more classification associations received from a plurality of user inputs.

11. The system as recited in claim 1, wherein the second fingerprint associated with the second classification model of the second data set is a fixed size metadata data structure that is generated for the second data set based on a plurality of data properties of data and metadata in the second data set, the plurality of data properties including one or more of: top K most frequent values; top K most frequent patterns; top K most frequent tokens; length distribution; minimum and/or maximum values; quantiles; cardinality; row counts; null counts; or numeric counts.

12. The system as recited in claim 1, wherein updating the first classification model is based on one or more contradictory features, the contradictory features comprising at least one of:
a values blacklist fingerprint;
a token blacklist fingerprint;
a pattern blacklist fingerprint; or
accumulated indications of rejection of one or more classification associations received from a plurality of user inputs.

13. A method comprising:
receiving, by a processor, a user input to create a classification to use for a first data set;
receiving a user input to associate the classification with the first data set as reference data;
generating a first fingerprint for a first classification model based on a plurality of data properties of the first data set, the plurality of data properties of the first data set being determined based on at least one of top K most frequent values, top K most frequent patterns, top K most frequent tokens, length distribution, minimum and/or maximum values, quantiles, cardinality, row counts, null counts, numeric counts, T-digest quantiles for numeric data, or hyperloglog for cardinality estimation;

determining a classification association with the first data set based in part on comparing the first fingerprint of the first classification model with a second fingerprint associated with a second classification model of a second data set, the second fingerprint being determined based at least in part on a plurality of data properties of the second data set;

determining a user curation result with respect to the classification association with the first data set; and updating the first classification model for the first data set based at least in part on the user curation result.

14. The method as recited in claim 13, wherein options available for user curation of the classification association include both an ability to accept the classification association and an ability to reject the classification association.

15. One or more non-transitory computer-readable media storing instructions that, when executed by one or more processors, configure the one or more processors to perform operations comprising:

receiving a user input to create a classification to use for a first data set;

receiving a user input to associate the classification with the first data set as reference data;

generating a first fingerprint for a first classification model based on a plurality of data properties of the first data set, the plurality of data properties of the first data set being determined based on at least one of top K most frequent values, top K most frequent patterns, top K most frequent tokens, length distribution, minimum and/or maximum values, quantiles, cardinality, row counts, null counts, numeric counts, T-digest quantiles for numeric data, or hyperloglog for cardinality estimation;

determining a classification association with the first data set based in part on comparing the first fingerprint of the first classification model with a second fingerprint associated with a second classification model of a second data set, the second fingerprint being determined based at least in part on a plurality of data properties of the second data set;

determining a user curation result with respect to the classification association with the first data set; and updating the first classification model for the first data set based at least in part on the user curation result.

16. The one or more non-transitory computer-readable media as recited in claim 15, wherein options available for user curation of the classification association include both an ability to accept the classification association and an ability to reject the classification association.

17. The one or more non-transitory computer-readable media as recited in claim 15, wherein the first classification model for the first data set includes the first fingerprint based of the plurality of data properties of the first data set, the operations further comprising:

receiving a user input to associate additional reference data with the first data set; and determining an aggregated fingerprint for the first data set, the aggregated fingerprint based at least in part on combining the first fingerprint and a fingerprint representative of the additional reference data, wherein a size of the aggregated fingerprint is same as a size of the first fingerprint.

18. The one or more non-transitory computer-readable media as recited in claim 15, wherein the second fingerprint associated with the second classification model of the second data set is a fixed size metadata data structure that is generated for the second data set based on a plurality of data properties of data and metadata in the second data set, the plurality of data properties including one or more of: top K most frequent values; bloom filters; top K most frequent patterns; top K most frequent tokens; length distribution; minimum and/or maximum values; quantiles; cardinality; row counts; null counts; or numeric counts.

19. The method as recited in claim 13, wherein the first classification model for the first data set includes the first fingerprint based of the plurality of data properties of the first data set, the method further comprising:

receiving a user input to associate additional reference data with the first data set; and determining an aggregated fingerprint for the first data set, the aggregated fingerprint based at least in part on combining the first fingerprint and a fingerprint representative of the additional reference data, wherein a size of the aggregated fingerprint is same as a size of the first fingerprint.

20. The method as recited in claim 13, wherein the second fingerprint associated with the second classification model of the second data set is a fixed size metadata data structure that is generated for the second data set based on a plurality of data properties of data and metadata in the second data set, the plurality of data properties including one or more of: top K most frequent values; bloom filters; top K most frequent patterns; top K most frequent tokens; length distribution; minimum and/or maximum values; quantiles; cardinality; row counts; null counts; or numeric counts.

* * * * *